United States Patent [19]

Harrell

[11] Patent Number: 5,595,078
[45] Date of Patent: Jan. 21, 1997

[54] STEERING WHEEL DISABLING MOTOR VEHICLE ANTI-THEFT DEVICE

[76] Inventor: Washington Harrell, 143-18 182 Pl., Springfield Garden, N.Y. 11413

[21] Appl. No.: 489,146

[22] Filed: Jun. 9, 1995

[51] Int. Cl.⁶ .................................................. B60R 25/02
[52] U.S. Cl. ................................ 70/209; 70/164; 70/226; 70/237
[58] Field of Search .................................. 70/54, 56, 55, 70/209, 226, 158, 159, 163, 164, 166, 170, 207, 211, DIG. 58, 212, 225, 237

[56] References Cited

U.S. PATENT DOCUMENTS

| | | | |
|---|---|---|---|
| 1,329,913 | 2/1920 | McGuire | 70/209 |
| 1,429,334 | 9/1922 | Furber | 70/209 |
| 3,718,014 | 2/1973 | Delgadillo | 70/56 |
| 3,982,602 | 9/1976 | Gorman | 70/212 X |
| 4,738,127 | 4/1988 | Johnson | 70/209 |
| 5,115,652 | 5/1992 | Starmer | 70/209 |
| 5,199,284 | 4/1993 | Lin | 70/209 |
| 5,261,258 | 11/1993 | Bunger | 70/56 |
| 5,385,038 | 1/1995 | Walker | 70/226 X |
| 5,415,018 | 5/1995 | Ferrante | 74/552 X |
| 5,450,736 | 9/1995 | Volkmar | 70/226 X |

FOREIGN PATENT DOCUMENTS

WO92/04211 3/1992 WIPO .................................. 70/209

*Primary Examiner*—Lloyd A. Gall
*Attorney, Agent, or Firm*—Richard L. Miller, P. E.

[57] ABSTRACT

A vehicle anti-theft steering wheel disabling device for a steering wheel that includes an upper plate, a rim, a lower plate, and removal preventing apparatus. The upper plate has an upper plate outer surface, an upper plate inner surface, an upper plate perimeter, and contains at least one upper plate aperture. The rim has a rim top, a rim bottom, contains a rim aperture, and is disposed on the upper plate lower surface at the upper plate perimeter. The lower plate has a lower plate inner surface, a lower plate perimeter, and is positioned with the lower plate inner surface disposed on the rim bottom at the lower plate perimeter. The upper plate, the rim, and the bottom plate form a steering wheel chamber for captivating the steering wheel with the steering wheel air bag side being covered by the upper plate. The removal preventing apparatus is disposed on the upper plate and the rim and prevents removal of the upper plate when the steering wheel is captivated in the steering wheel chamber so that access to the steering wheel air-bag side is denied and removal of the air bag is prevented.

5 Claims, 1 Drawing Sheet

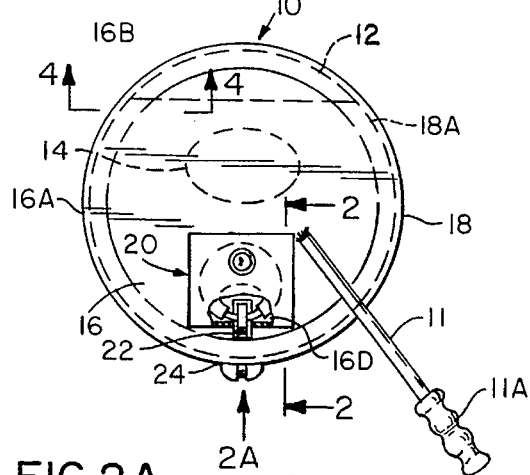
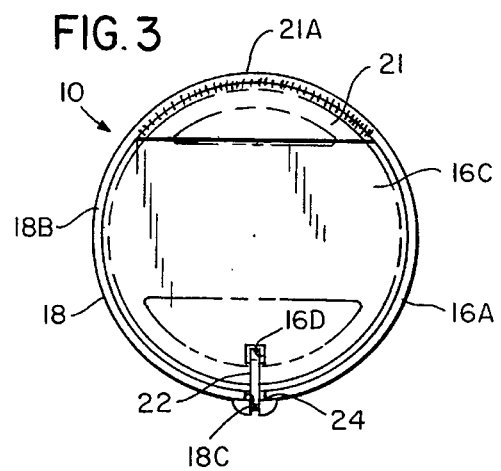
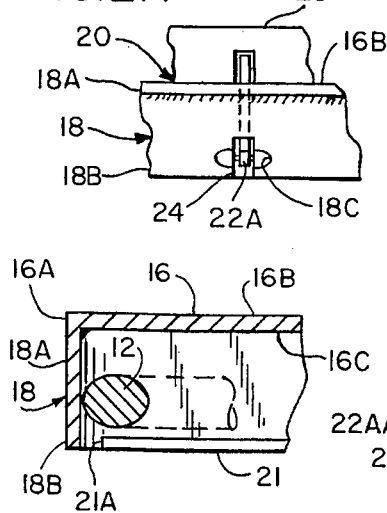
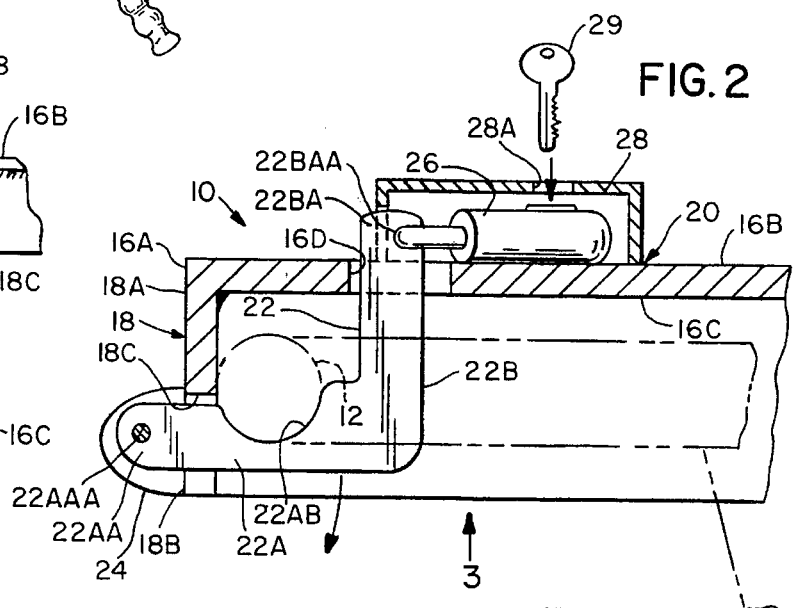
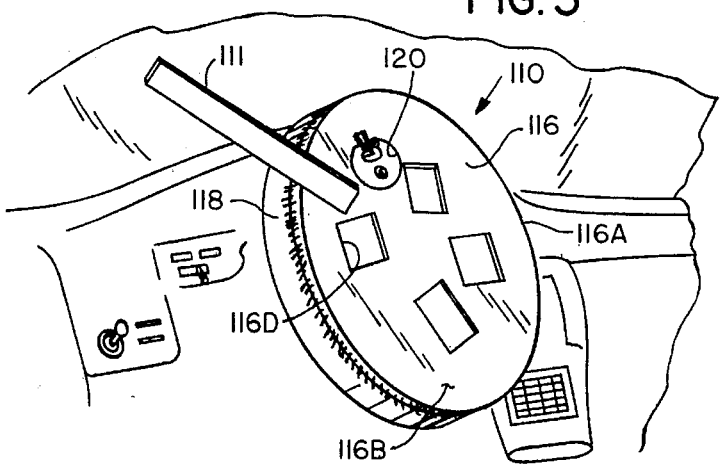

STEERING WHEEL DISABLING MOTOR VEHICLE ANTI-THEFT DEVICE

CROSS REFERENCES

This application contains subject matter disclosed in applicant's Disclosure Document No. 363,192 filed on or about Oct. 13, 1994. As such, it is respectfully requested that the disclosure document be relied upon and remain a permanent part of the file history during the prosecution of the instant application and during any subsequent action therefrom.

BACKGROUND OF THE INVENTION

The prevent invention relates to a motor vehicle anti-theft device. More particularly, the present invention relates to a motor vehicle anti-theft device that in addition to immobilizing the vehicle steering wheel, it protects against the unwanted removal of the driver side air bag.

Numerous innovations for motor vehicle anti-theft devices have been provided in the prior art. However, even though these innovations may be suitable for the specific individual purposes to which they address, they differ from the present invention in that they do not teach a motor vehicle anti-theft device that in addition to immobilizing the vehicle steering wheel, it protects against the unwanted removal of the driver side air bag.

Furthermore, even though these innovations may be suitable for the specific individual purposes to which they address, they would not be suitable for the purposes of the present invention as heretofore described.

SUMMARY OF THE INVENTION

Accordingly, an object of the present invention is to provide a motor vehicle anti-theft device that avoids the disadvantages of the prior art.

Another object of the present invention is to provide a motor vehicle anti-theft device that is simple and inexpensive to manufacture.

Still another object of the present invention is to provide a motor vehicle anti-theft device that is simple to use.

Yet another object of the present invention is to provide a motor vehicle anti-theft device that prevents the steering wheel from being cut.

Still yet another object of the present invention is to provide a motor vehicle anti-theft device that minimizes the amount of rotation of the steering wheel.

Yet still another object of the present invention is to provide a motor vehicle anti-theft device that prevents the removal of the driver side air bag.

Still yet another object of the present invention is to provide a motor vehicle anti-theft device for a steering wheel that includes an upper plate, a rim, a lower plate, and removal preventing apparatus.

Yet still another object of the present invention is to provide a motor vehicle anti-theft device wherein the upper plate has an upper plate outer surface, an upper plate inner surface, an upper plate perimeter, and contains at least one upper plate aperture.

Still yet another object of the present invention is to provide a motor vehicle anti-theft device wherein the rim has a rim top, a rim bottom, and contains a rim aperture and is disposed on the upper plate lower surface at the upper plate perimeter.

Yet still another object of the present invention is to provide a motor vehicle anti-theft device wherein the lower plate has a lower plate inner surface and a lower plate perimeter and is positioned with the lower plate inner surface disposed on the rim bottom at the lower plate perimeter.

Still yet another object of the present invention is to provide a motor vehicle anti-theft device wherein the upper plate, the rim, and the bottom plate form a steering wheel chamber for encasing the steering wheel with the steering wheel air bag side being completely covered by the upper plate.

Yet still another object of the present invention is to provide a motor vehicle anti-theft device wherein the preventing apparatus is disposed on the upper plate and the rim and prevents removal of the upper plate when the steering wheel is encased in the steering wheel chamber so that access to the steering wheel air-bag side is prevented eliminating unwanted removal of the air bag.

Still yet another object of the present invention is to provide a motor vehicle anti-theft device wherein the upper plate and the rim are integrally formed.

Yet still another object of the present invention is to provide a motor vehicle anti-theft device wherein the lower plate and the rim are integrally formed.

Still yet another object of the present invention is to provide a motor vehicle anti-theft device wherein the upper plate is welded to the rim.

Yet still another object of the present invention is to provide a motor vehicle anti-theft device wherein the lower plate is welded to the rim.

Still yet another object of the present invention is to provide a motor vehicle anti-theft device wherein the upper plate is circular.

Yet still another object of the present invention is to provide a motor vehicle anti-theft device wherein the rim is circular.

Still yet another object of the present invention is to provide a motor vehicle anti-theft device wherein the lower plate is semi-circular.

Yet still another object of the present invention is to provide a motor vehicle anti-theft device wherein the removal preventing apparatus includes a hasp pivotally connected to the rim and has a hasp closed position.

Still yet another object of the present invention is to provide a motor vehicle anti-theft device wherein the hasp is substantially "L"-shaped and has a hasp first leg and a hasp second leg.

Yet still another object of the present invention is to provide a motor vehicle anti-theft device wherein the hasp first leg has a hasp first leg end that contains a hasp first leg end aperture that is disposed external to the rim.

Still yet another object of the present invention is to provide a motor vehicle anti-theft device wherein the hasp second leg has a hasp second leg end that contains a hasp second end aperture.

Yet still another object of the present invention is to provide a motor vehicle anti-theft device wherein the hasp second leg end passes through the upper plate aperture with the hasp second leg end aperture disposed external to the upper plate outer surface when the hasp is in the closed position.

Still yet another object of the present invention is to provide a motor vehicle anti-theft device wherein the first leg inner surface contour substantially matches the steering wheel cross-section so that when the hasp is in the closed position the steering wheel rests within the hasp first leg.

Yet still another object of the present invention is to provide a motor vehicle anti-theft device that further includes maintaining apparatus for maintaining the hasp in the hasp closed position.

Still yet another object of the present invention is to provide a motor vehicle anti-theft device wherein the maintaining apparatus is disposed on the upper plate outer surface.

Yet still another object of the present invention is to provide a motor vehicle anti-theft device wherein the maintaining apparatus includes a pad lock with a pad lock tumbler part and a pad lock hasp part.

Still yet another object of the present invention is to provide a motor vehicle anti-theft device wherein the pad lock hasp part passes through the hasp second leg free end aperture so that the hasp is maintained in the hasp closed position.

Yet still another object of the present invention is to provide a motor vehicle anti-theft device that further includes a protective cover for preventing access to the pad lock.

Still yet another object of the present invention is to provide a motor vehicle anti-theft device wherein the protective cover is disposed on the upper plate outer surface.

Yet still another object of the present invention is to provide a motor vehicle anti-theft device wherein the protective cover contains a protective cover aperture that is in direct alignment with the pad lock tumbler part.

Still yet another object of the present invention is to provide a motor vehicle anti-theft device that further includes minimizing apparatus for minimizing rotation of the steering wheel.

Yet still another object of the present invention is to provide a motor vehicle anti-theft device wherein the minimizing apparatus is disposed on the upper plate outer surface.

Still yet another object of the present invention is to provide a motor vehicle anti-theft device wherein the minimizing apparatus includes a projection that extends past the rim.

Finally, an object of the present invention is to provide a motor vehicle anti-theft device wherein the projection has a hand grip to assist in carrying the anti-theft device.

The novel features which are considered characteristic of the present invention are set forth in the appended claims. The invention itself, however, both as to its construction and its method of operation, together with additional objects and advantages thereof, will be best understood from the following description of the embodiments when read and understood in connection with the accompanying drawing.

BRIEF DESCRIPTION OF THE DRAWING

FIG. 1 is a diagrammatic top plan view of a first embodiment of the instant invention installed on a typical steering wheel of an automobile;

FIG. 2 is an enlarged cross sectional view with parts broken away taken on line 2—2 of FIG. 1;

FIG. 2A is an elevational view with parts broken away taken in the direction of arrow 2A in FIG. 1;

FIG. 3 is a bottom plan view taken in the direction of arrow 3 in FIG. 2 of the instant invention with a typical steering wheel shown in phantom captivated inside;

FIG. 4 is a cross sectional view taken on line 4—4 of FIG. 1; and

FIG. 5 is an enlarged diagrammatic perspective view of a second embodiment of the instant invention.

LIST OF REFERENCE NUMERALS UTILIZED IN THE DRAWING

Preferred Embodiment 10-anti-theft device of the present invention
11-handle
11A-handle grip
12-steering wheel
12A-steering wheel air-bag side
14-air bag
16-circular upper plate
16A-circular upper plate perimeter
16B-circular upper plate upper surface
16C-circular upper plate lower surface
16D-circular upper plate aperture
18-circular rim
18A- circular rim top
18B-circular rim bottom
18C-circular rim aperture
20-locking arrangement
21-semi-circular lower plate
21A-semi-circular lower plate semi-circular perimeter
22-hasp
22A-hasp first leg
22AA-hasp first leg free end
22AAA-hasp first leg free end aperture
22AB-hasp first leg inner surface
22B-hasp second leg
22BA-hasp second leg free end
22BAA-hasp second leg free end aperture
24-hinge
26-padlock
28-protective cover
28A-protective cover aperture
29-key Alternate Embodiment 110-anti-theft device
111-handle
116-circular upper plate
116A-circular upper plate perimeter
116D-circular upper plate plurality of apertures
118-circular rim
120-locking arrangement

DETAILED DESCRIPTION OF THE PREFERRED EMBODIMENT

Referring now to the figures in which like numerals indicate like parts, and particularly to FIG. 1, the motor vehicle anti-theft device of the present invention is shown generally at 10 captivating a steering wheel 12 that contains an air bag 14.

The general configuration of the motor vehicle anti-theft device 10 can best be seen in FIGS. 1, 3 and 4, and as such, will be discussed with reference thereto.

The motor vehicle anti-theft device 10 includes a circular upper plate 16 with a circular upper plate perimeter 16A, a circular upper plate upper surface 16B, a circular upper plate lower surface 16C, and a circular upper plate aperture 16D.

A handle 11 is disposed on the circular upper plate 16 with a portion thereof extending past the circular upper portion perimeter 16A that has a hand grip 11A. The handle 11 assists in transporting the anti-theft device 10 and functions to minimize the rotation of the steering wheel 12 when the anti-theft device 10 is utilized.

A circular rim 18 has a circular rim top 18A, a circular rim bottom 18B, and a circular rim aperture 18C. The circular rim top 18A is disposed on the circular upper plate lower surface 16C at the circular upper plate perimeter 16A. The circular upper plate 16 and the circular rim 18 may be integrally formed by folding or stamping, or may be by welded together.

A semi-circular lower plate 21 has a semi-circular lower plate semi-circular perimeter 21A that is disposed at the circular rim bottom 18B. The semi-circular lower plate 21 and the circular rim 18 may be integrally formed by folding or stamping, or may be welded together.

The configuration of a locking arrangement 20 can best be seen in FIGS. 2 and 2A, and as such will be discussed with reference thereto.

The locking arrangement 20 includes a hasp 22 that is a substantially "L"-shaped member with a hasp first leg 22A and a hasp second leg 22B. The hasp first leg 22A has a hasp first leg free end 22AA that contains a hasp first leg free end aperture 22AAA, and a hasp first leg inner surface 22AB. The hasp first leg inner surface 22AB has a contour that substantially matches the contour of the steering wheel 12 so that when the hasp 22 is in the closed position, to be discussed infra, the steering wheel 12 will rest within the hasp first leg 22A. The hasp second leg 22B is disposed substantially perpendicular to and may be integrally formed with the hasp first leg 22A, but is not limited to that.

The hasp 22 has a hasp second leg free end 22BA that contains a hasp second leg free end aperture 22BAA. The hasp first leg free end 22AA passes through the circular rim aperture 18C with the hasp first leg free end aperture 22AAA positioned external to the circular rim 18. The hasp first leg free end 22AA is pivotally mounted, via the hasp first leg free end aperture 22AAA and a hinge 24, to the outer surface of the circular rim 18.

When the hasp 22 is in the closed position, the hasp second leg free end 22BAA passes through the circular upper plate 16 with the hasp second leg free end aperture 22BA positioned above the upper plate upper surface 16B and the steering wheel 12 rests within the hasp first leg 22A. A pad lock 26 passes through the hasp second leg free end aperture 22BAA when the hasp 22 is in the closed position. By maintaining the hasp 22 in the closed position, any further pivoting of the hasp 22 is prevented, and access to the steering wheel 12 is prevented.

A protective cover 28 that is disposed on the circular upper plate 16 and positioned over the padlock 26 provides protection against any unwanted tampering with the padlock 26. The protective cover 28 contains a protective cover aperture 28A that is in alignment with the tumblers of the padlock 26 so that a user with a key 29 can access the padlock lock 26.

An alternate embodiment of the present invention can best be seen in FIG. 5, and as such, will be discussed with reference thereto.

The motor vehicle anti-theft device of the present invention is shown generally at 110 captivating a steering wheel (not shown) that contains an air bag (not shown). The motor vehicle anti-theft device 110 includes a circular upper plate 116 with a circular upper plate perimeter 116A, a circular upper plate upper surface 116B, a circular upper plate lower surface (not shown), and a plurality of circular upper plate apertures 116D which function to decrease the overall weight of the anti-theft device 110. A handle 111 is welded to the circular upper plate 116 with a portion thereof extending past the circular upper portion perimeter 116A. The handle 111 assists in transporting the anti-theft device 110 and functions to minimize the rotation of the steering wheel when the anti-theft device 110 is utilized. A circular rim 118 has a circular rim top (not shown), and a circular rim bottom (not shown). The circular rim top is disposed on the circular upper plate lower surface at the circular upper plate perimeter 116A. The circular upper plate 116 and the circular rim 118 may be integrally formed or stamping, or may be welded together, with a locking arrangement 120 secured thereto.

It will be understood that each of the elements described above, or two or more together, may also find a useful application in other types of constructions differing from the types described above.

While the invention has been illustrated and described as embodied in a motor vehicle steering wheel anti-theft device, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

What is claimed as new and desired to be protected by Letters Patent is set forth in the appended claims.

What is claimed is:

1. A vehicle anti-theft steering wheel disabling device replaceably attachable to a steering wheel of a vehicle having a windshield and preventing the unauthorized access to an air bag contained in the steering wheel of the vehicle while preventing the unrestricted rotation of the steering wheel of the vehicle, the steering wheel of the vehicle having a front, a circumference, a lower portion with a back, a cross section, and an upper portion, said device comprising:

a) a circular-shaped upper plate positioned over, and concealing, the front of the steering wheel of the vehicle when said vehicle anti-theft steering wheel disabling device is installed on the steering wheel of the vehicle, so that unauthorized access to the air bag contained in the steering wheel of the vehicle is prevented; said circular-shaped upper plate having a circular-shaped outer surface, a circular-shaped inner surface disposed below, and parallel to, said circular-shaped outer surface of said circular-shaped upper plate, a circular-shaped perimeter, and a square-shaped throughbore extending therethrough from said circular-shaped outer surface of said circular-shaped upper plate to said circular-shaped inner surface of said circular-shaped upper plate and being disposed in close proximity to said circular-shaped perimeter of said circular-shaped upper plate; said square-shaped throughbore in said circular-shaped upper plate being positioned in close proximity to the upper portion of the steering wheel of the vehicle when said vehicle anti-theft steering wheel disabling device is installed on the steering wheel of the vehicle, so that said square-shaped throughbore in said circular-shaped upper plate is easily accessible when said vehicle anti-theft steering wheel disabling device is installed on the steering wheel of the vehicle;

b) a hollow and cylindrically-shaped rim positioned around, and concealing, the circumference of the steering wheel of the vehicle when said vehicle anti-theft steering wheel disabling device is installed on the steering wheel of the vehicle; said hollow and cylindrically-shaped rim having a circular-shaped upper edge, a circular-shaped lower edge, a cylindrically-shaped outer surface, and a cylindrically-shaped inner surface disposed inward of, and parallel to, said cylindrically-shaped outer surface of said hollow and cylindrically-shaped rim; said hollow and cylindrically-shaped rim extending perpendicularly downwardly from said circular-shaped upper plate, with said circular-shaped upper edge of said hollow and cylindrically-shaped rim being coincident with, and welded to, said circular-shaped perimeter of said circular-shaped upper plate, so that manufacturing thereof is simplified; said hollow and cylindrically-shaped rim further having a rectangular-shaped throughslot extending therethrough from said cylindrically-shaped outer surface of said hollow and cylindrically-shaped rim to said cylindrically-shaped inner surface of said hollow and cylindrically-shaped rim; said rectangular-shaped throughslot in said hollow and cylindrically-shaped rim further extending perpendicularly upwardly from, and opening into said, circular-shaped lower edge of said hollow and cylindrically-shaped rim; said rectangular-shaped throughslot in said hollow and cylindrically-shaped rim being in alignment with, and in close proximity to, said square-shaped throughbore in said circular-shaped upper plate and thereby also being positioned in close proximity to the upper portion of the steering wheel of the vehicle when said vehicle anti-theft steering wheel disabling device is installed on the steering wheel of the vehicle, so that said rectangular-shaped throughslot in said hollow and cylindrically-shaped rim is easily accessible when said vehicle anti-theft steering wheel disabling device is installed on the steering wheel of the vehicle;

c) a semi-circular-shaped lower plate positioned over, and concealing, the back of the lower portion of the steering wheel of the vehicle when said vehicle anti-theft steering wheel disabling device is installed on the steering wheel of the vehicle; said semi-circular-shaped lower plate having a semi-circular-shaped perimeter portion being coincident with, and welded to, said circular-shaped lower edge of said hollow and cylindrically-shaped rim, so that manufacturing thereof is simplified; said semi-circular-shaped lower plate being disposed opposite to said rectangular-shaped throughslot in said hollow and cylindrically-shaped rim; said circular-shaped upper plate, said hollow and cylindrically-shaped rim, and said semi-circular-shaped lower plate forming a receptacle for receiving the lower portion of the steering wheel of the vehicle when said vehicle anti-theft steering wheel disabling device is installed on the steering wheel of the vehicle;

d) a pair of vertically-oriented shrouds extending radially perpendicularly outwardly from said cylindrically-shaped outer surface of said hollow and cylindrically-shaped rim and straddling said rectangular-shaped throughslot in said hollow and cylindrically-shaped rim; each shroud of said pair of vertically-oriented shrouds having a laterally-oriented throughbore extending laterally therethrough that are in lateral alignment with each other;

e) a slender, elongated, cylindrically-shaped handle having a free end; said slender, elongated, cylindrically-shaped handle being fixedly attached by welding to, and extending radially outwardly from, said circular-shaped outer surface of said circular-shaped upper plate, so that manufacturing thereof is simplified and carrying of said vehicle anti-theft steering wheel disabling device is facilitated; said slender, elongated, cylindrically-shaped handle disposed in close proximity to said square-shaped throughbore in said circular-shaped upper plate and thereby also positioned in close proximity to the upper portion of the steering wheel of the vehicle when said vehicle anti-theft steering wheel disabling device is installed on the steering wheel of the vehicle; said slender, elongated, cylindrically-shaped handle extending generally upwardly and approaching, if not abutting against, the windshield of the vehicle when said vehicle anti-theft steering wheel disabling device is installed on the steering wheel of the vehicle, so that unrestricted rotation of the steering wheel of the vehicle is prevented;

f) a substantially L-shaped hasp having a first leg with a free end having a lateral throughbore extending laterally therethrough, a second leg perpendicular to said first leg of said substantially L-shaped hasp and having a free end with a lateral throughbore extending laterally therethrough, a closed position, and an open position; said free end of said first leg of said substantially L-shaped hasp disposed between said pair of vertically-oriented shrouds and being pivotally mounted thereto by a pin extending through said laterally-oriented throughbore in each shroud of said pair of vertically-oriented shrouds and through said lateral throughbore in said free end of said first leg of said substantially L-shaped hasp, so that said substantially L-shaped hasp is pivotally mounted to said cylindrically-shaped outer surface of said hollow and cylindrically-shaped rim; said substantially L-shaped hasp being in close proximity to the upper portion of the steering wheel when said vehicle anti-theft steering wheel disabling device is installed on the steering wheel of the vehicle, so that said substantially L-shaped hasp is easily accessible when said vehicle anti-theft steering wheel disabling device is installed on the steering wheel of the vehicle; said first leg of said substantially L-shaped hasp extending radially inwardly through, without extending below, said rectangular-shaped throughslot in said hollow and cylindrically-shaped rim with the upper portion of the steering wheel of the vehicle resting thereon and said second leg of said substantially L-shaped hasp extending vertically upwardly through said square-shaped throughbore in said circular-shaped upper plate with said lateral throughbore in said free end of said second leg of said substantially L-shaped hasp disposed thereabove when said substantially L-shaped hasp is in said closed position; said first leg of said substantially L-shaped hasp leaving said rectangular-shaped throughslot in said hollow and cylindrically-shaped rim and said second leg of said substantially L-shaped hasp leaving said square-shaped throughbore in said circular-shaped upper plate when said substantially L-shaped hasp is in said open position; and g) a padlock having a tumbler part and a hasp part; said hasp part of said padlock passing through said lateral throughbore in said free end of said second leg of said substantially L-shaped hasp when said substantially L-shaped hasp is in said closed position and thereby maintaining said substantially L-shaped hasp in said closed position, so that said substantially L-shaped hasp can not unauthorizably achieve said open position and thereby preventing unauthorized removal of said vehicle anti-theft steering wheel disabling device from the steering wheel of the vehicle and thereby preventing unauthorized access to the air bag in the steering wheel, while said slender, elongated, cylindrically-shaped handle approaches, if not abutting against, the windshield of the vehicle so as to prevent unrestricted rotation of the steering wheel of the vehicle.

2. The device as defined in claim 1, wherein said first leg of said substantially L-shaped hasp has an inner edge with a recess that has a contour that substantially matches the cross section of the steering wheel of the vehicle, so that the upper portion of the steering wheel of the vehicle rests within said first leg of said substantially L-shaped hasp when said substantially L-shaped hasp is in said closed position.

3. The device as defined in claim 1, further comprising a hollow parallelepiped-shaped protective cover disposed on said circular-shaped outer surface of said circular-shaped upper plate and housing said padlock, so that access to said padlock is prevented; said hollow parallelepiped-shaped protective cover having a throughbore extending therethrough that is aligned with said tumbler part of said padlock, so that said tumbler part of said padlock can be accessed.

4. The device as defined in claim 1, further comprising a handgrip disposed on said free end of said slender, elongated, cylindrically-shaped handle, so that gripping said slender, elongated, cylindrically-shaped handle is facilitated.

5. The device as defined in claim 1, wherein said circular-shaped upper plate further has a plurality of additional throughbores extending therethrough, so that weight of said vehicle anti-theft steering wheel disabling device is reduced.

* * * * *